Feb. 9, 1971    P. BERRY    3,561,883
BLOWERS

Filed Dec. 2, 1968    4 Sheets-Sheet 1

INVENTOR
PAUL BERRY
By Young + Thompson
ATTYS.

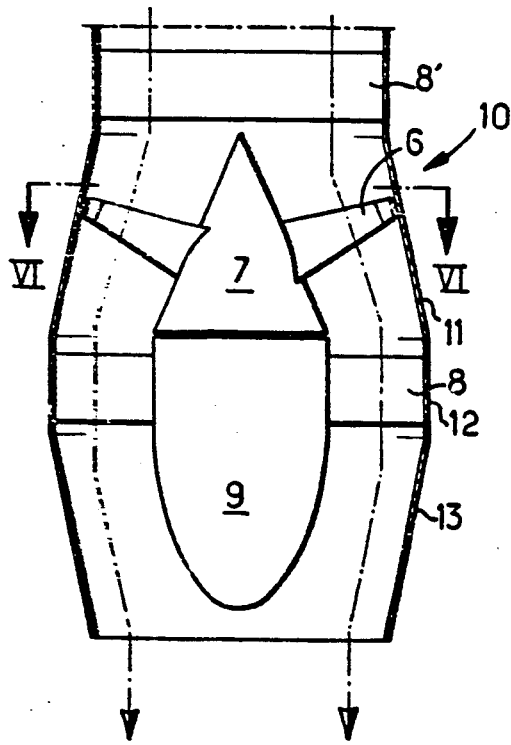
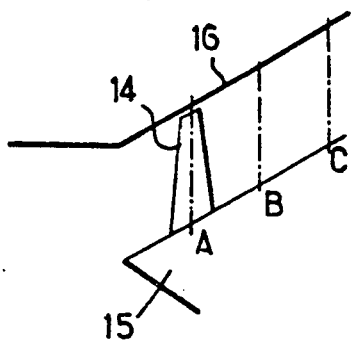
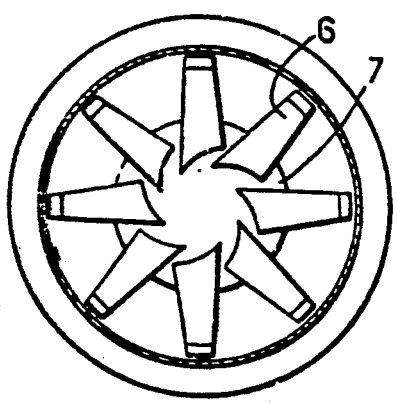
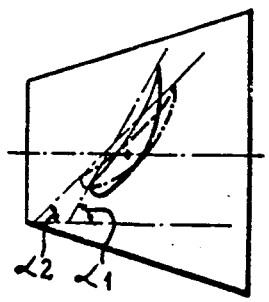

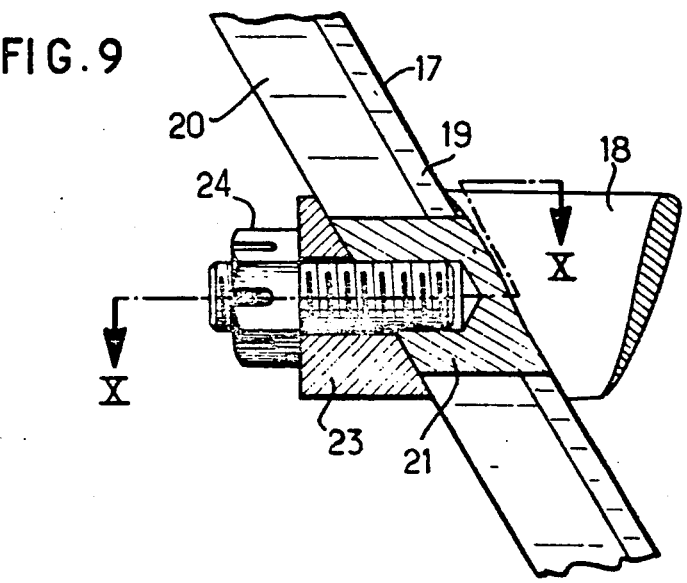
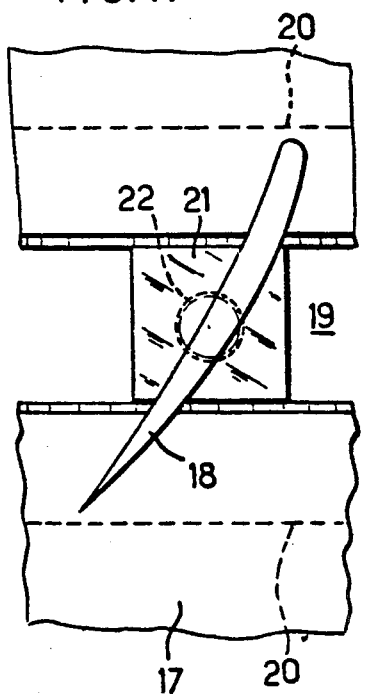
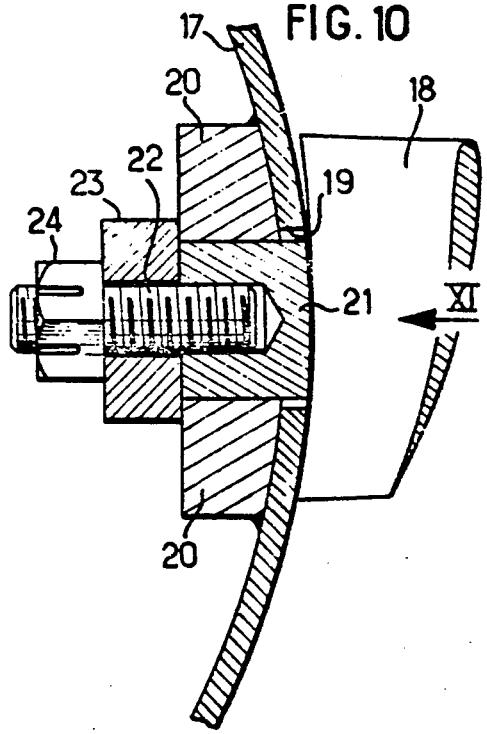

INVENTOR
PAUL BERRY
BY Young & Thompson
ATTYS

United States Patent Office 3,561,883
Patented Feb. 9, 1971

3,561,883
BLOWERS
Paul Berry, 23 Avenue de Saint-Maur,
59 La Madeleine (Nord), France
Filed Dec. 2, 1968, Ser. No. 780,525
Claims priority, application France, Dec. 12, 1967,
131,823
Int. Cl. F04d 19/00, 27/00, 299/26
U.S. Cl. 415—131                              4 Claims

ABSTRACT OF THE DISCLOSURE

The rotor for a blower comprises a hub of varying cross-section and the blades are mounted on the hub to be movable lengthwise thereof to selected positions which make it possible to modify the external diameter of the helix and consequently the operating characteristics of the blower.

BACKGROUND OF THE INVENTION

This invention relates to blowers and it is a main object of the invention to provide a rotor for a blower having selectively variable dimensions offering a wide range of operating characteristics.

SUMMARY

A rotor according to the invention comprises a hub of varying cross-section, blades mounted on the hub, and means permitting movement of the blades to alternative dispositions thereof lengthwise of the hub, thereby rendering it possible to modify the external diameter of the helix and consequently the operating characteristics of the blower with which the rotor is associated.

In one embodiment, the blades are slidably arranged along the hub and may be locked in any required position after translatory displacement.

According to one embodiment of a blower provided with a rotor of this kind the blades are of the variable setting angle type, and the delivery-pressure characteristics of the blower may then be modified by changing either the disposition of the blades along the hub, or their setting angle, or both these parameters at the same time.

BRIEF DESCRIPTION OF THE DRAWINGS

FIG. 5 illustrates a modification to the blower of FIG. 3, FIG. 6 is a section on line VI—VI, FIG. 5, FIG. 7 is a diagram relating to the change in disposition of the blades along a conical hub, FIG. 8 illustrates the change in the setting angle of the blades of FIG. 5, FIGS. 9, 10 and 11 respectively illustrate a blade slidingly arranged on a conical hub, in axial section, in cross-section, and in end-view.

DESCRIPTION OF THE PREFERRED EMBODIMENTS

Figure 1:
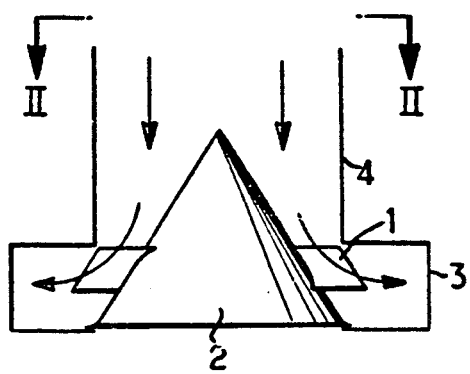
FIG. 1 is a diagrammatic view, in axial section, of a helio-centrifugal blower.
Figure 2:
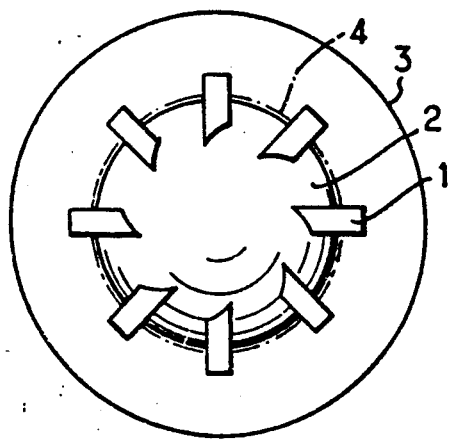
FIG. 2 is a section on line II—II, FIG. 1.

Referring to FIGS. 1 and 2, a helio-centrifugal blower has blades 1 arranged on a conical hub 2, within a housing 3. The blades 1 may be set in variable position along the hub and to this end have an appropriate method of installation, of which an example will be described hereinafter. The axial length of the hub 2 exceeds that of the housing 3 and terminates in a tip to act as a divider within an intake duct 4 of smaller cross-section than that of the housing 3 and illustrated dash-dotted in FIG. 2.

Figure 3:
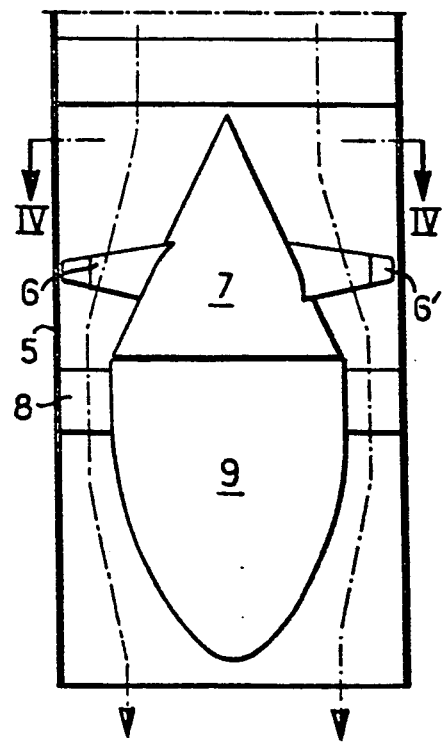
FIG. 3 is a diagrammatic view, in axial section, of a so-called "pseudo-axial" blower having an axial inlet and outlet, with changes in direction of the air flowliness abreast of the apparatus.
Figure 4:
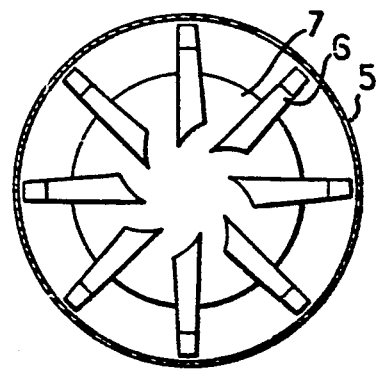
FIG. 4 is a section on line IV—IV, of FIG. 3.

In FIGS. 3 and 4, a cylindrical housing 5 encloses a blower rotor having blades 6 arranged on a conical hub 7. The air impelled passes between "rectifiers" 8 and escapes around a stationary cap or shell 9 which straightens out the airflow paths towards the axis of the apparatus. The air intake and outlet are co-axial.

In the embodiment of FIGS. 5 and 6, the elements 6, 7, 8 and 9 are analogous to the elements bearing the same references in FIGS. 3 and 4. As for the housing 10, this has a downwardly (downstream) divergent frusto-conical portion 11 abreast of the hub 7, a cylindrical portion 12 abreast of the rectifiers 8, and a frusto-conical portion 13 convergent in the downstream direction, abreast of the cap 9. If desired guide vanes 8' are situated upstream of the rotor.

In the diagram of FIG. 7, variably disposable blades 14 are arranged on a conical hub 15 within a housing 16. The points A, C and B, respectively, illustrate the two extreme positions and an intermediate position of the blades. The annular space between the hub 15 and the housing 16 is of constant width; the bases of the blades are cut for the position C whereas their tips are cut for the position A, and this permits translatory displacement of the blades throughout the distance from A to C.

A series of blowers possessing different characteristics is thus obtained with one and the same apparatus, the rate of flow and the pressure increasing as the blades are displaced from A towards C.

The blade tip clearance, variable as a function of the blade, remains acceptable if the translatory displacement is not very great. If the annular space between the hub 15 and the housing 16 is not of constant width, a single set of blades may be employed corresponding to the minimum width and an element 6 (FIG. 3) is added thereto which renders it possible to make up the distance between the housing and the hub for dispositions corresponding to greater widths.

It should be noted that, in this case, the position of the axis of the blade is not critical. It may be radial or otherwise.

In the diagram of FIG. 8, a conical hub is provided with blades pivotally arranged about their axes, of which one blade is illustrated by way of example in two different positions, being a position shown in solid lines corresponding to the angle alpha-1 and one shown dash-dotted, characterised by the angle alpha-2<alpha-1. The passage from alpha-1 to alpha-2 results in an increase in the delivery-pressure characteristics and principally in an increase in the rate of delivery.

However, since the base of the blade is joined to a conical surface, any modification of the setting angle causes a change in the clearance between the blade and the hub, this change depending on the position of the axis of the blade with respect to the hub. In the case of a blade of normal width relative to the diameter, and for a range of setting angle variation sufficient in the majority of cases, the clearance remains acceptable provided that the axis of the blade does not move too far from the line at right angles to the surface of the hub.

In a blower possessing a conical hub provided with blades of the variable displacement and setting angle kind, two parameters are thus available which render it possible to modify the operating characteristics.

FIGS. 9, 10 and 11 illustrate details of the installation of a variable displacement blade displaceable along a hub. The hollow hub 17 is of conical or frustoconical shape possessing a longitudinal slot 19 abreast of each blade 18. Two small bars 20 on the inner surface of the hub 17 and situated at each side of the slot 19, form a guideway for a block 21 secured to the base of the blade 18. A screw-threaded rod 22 fastened to the block 21 traverses a take-up block or spacer 23 which is chamfered and slides on the inclined inner surfaces of the small bars 20. The rod 22 at its outer end carries a nut 24 intended to clamp the block 23 against the small bars 20 to immobilise the blade 18 in the required position.

Figure 12:
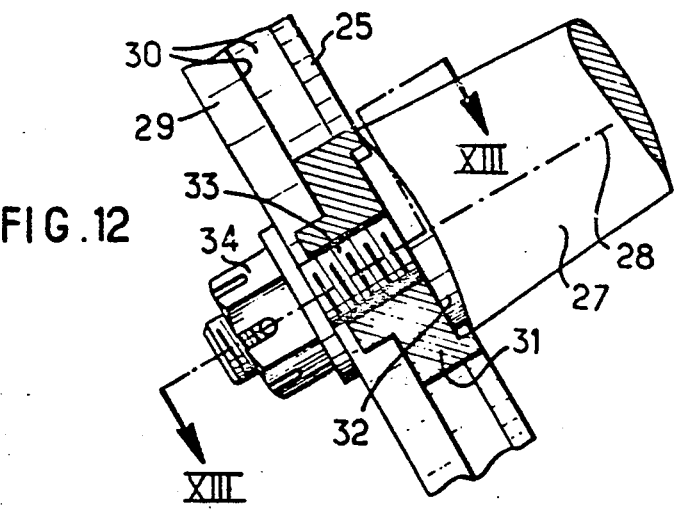
FIGS. 12, 13 and 14, are similar to FIGS. 9, 10 and 11, but illustrate a blade whose disposition and setting angle are variable.
Figure 14:
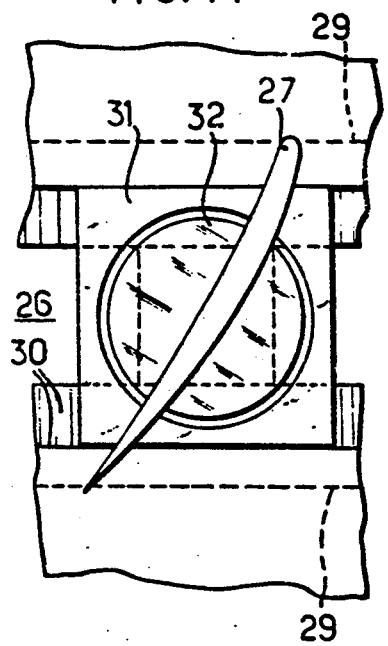
Figure 13:
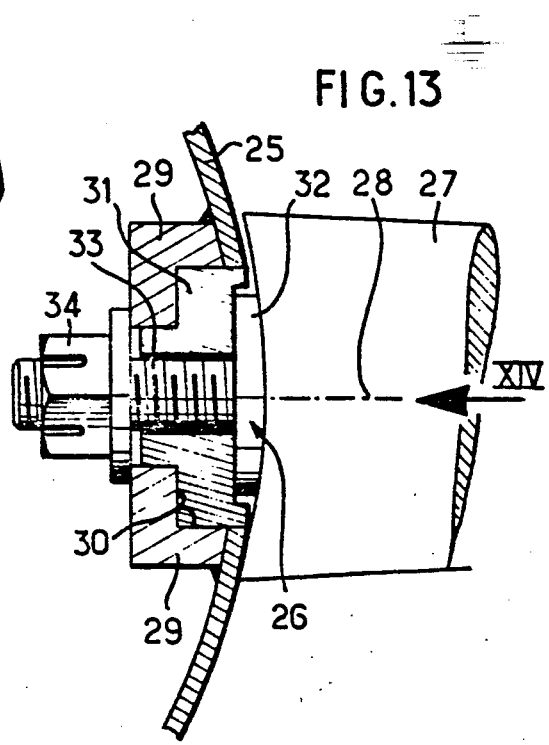

According to FIGS. 12, 13 and 14, a hollow frustoconical hub 25 has longitudinal slots 26 situated abreast of blades 27 whose axes 28 are at right angles to the surface of the hub. Two small bars 29 welded to the inner surface of the hub and situated on opposite sides of the slot 26, possess in alignment with each other step profiles 30 which form a guiding slideway for a block 31. The blade 27 has a base 32 which bears on the block 31 and terminates in a screw-threaded shank 33; the latter freely traverses the block 31 and carries a nut 34 on its extremity. The blade 27 can thus pivot in the block 31, the block 31 can slide between the small bars 29, and the two sliding and pivoting motions may be locked by tightening the nut 34 against the small bars 29.

If applicable, the longitudinal slots 26 of the hub are plugged by means of removable elements, not shown.

In the embodiment of FIGS. 12 and 14, a particular state of operation may be obtained by translatory displacement of the blade along a generatrix, or by rotation of the blade. It is of interest however to place the blade in a position such as to secure the highest (output) efficiency. For the delivery-pressure characteristics imposed, it is the degree of efficiency which will determine the position of the blade.

The rule of variation as a function of the translatory displacement and of the setting angle may be determined on a test bench and applied to cover other blowers of different diameters on the basis of the law of similarity.

I claim:

1. A rotor for a blower comprising a hub of varying cross section lengthwise of the hub, blades mounted on the hub, and means permitting movement of the blades to alternative dispositions thereof lengthwise of the hub, said hub having longitudinal slots therein, said means comprising an insert disposed in each slot, means for selectively securing said insert in any of a plurality of positions lengthwise of the slot, and means for adjustably securing each blade to a said insert in any of a plurality of positions of rotation of the blade about its spanwise axis relative to the insert.

2. A rotor as claimed in claim 1, and a housing defining an air inlet and an air outlet coaxial with said hub.

3. The combination of claim 2, and a cap on the outlet side of the hub convergent toward the outlet to straighten out the air flow.

4. The combination of claim 2, and a stationary shell located adjacent to the hub and downstream thereof in the direction of air flow with rectifiers positioned around said shell and within said housing, said housing having a downstream divergent frusto-conical portion abreast of the hub, a cylindrical portion abreast of the rectifiers and a downstream convergent frusto-conical portion abreast of the shell, the hub being cone-shaped and pointing in an upstream direction relative to the air flow.

References Cited

UNITED STATES PATENTS

| | | | |
|---|---|---|---|
| 2,986,218 | 5/1961 | Wagner et al. | 230—114 |
| 3,225,537 | 12/1965 | Parsons | 103—88 |
| 2,189,767 | 2/1940 | Vose | 230—119 |
| 2,991,927 | 7/1961 | Quick | 230—119 |
| 3,026,085 | 3/1962 | Whippen et al. | 253—31 |
| 3,102,679 | 9/1963 | Rudy | 230—119 |
| 3,357,496 | 12/1967 | Petersen | 230—114 |

FOREIGN PATENTS

| | | | |
|---|---|---|---|
| 860,024 | 9/1940 | France | 415—113 |
| 1,116,973 | 11/1961 | Germany | 415—160 |
| 332,943 | 2/1921 | Germany | 253—148 |
| 250,234 | 7/1926 | Great Britain | 253—148 |

HENRY F. RADUAZO, Primary Examiner

U.S. Cl. X.R.

415—187; 416—87